United States Patent Office 2,809,452
Patented Oct. 15, 1957

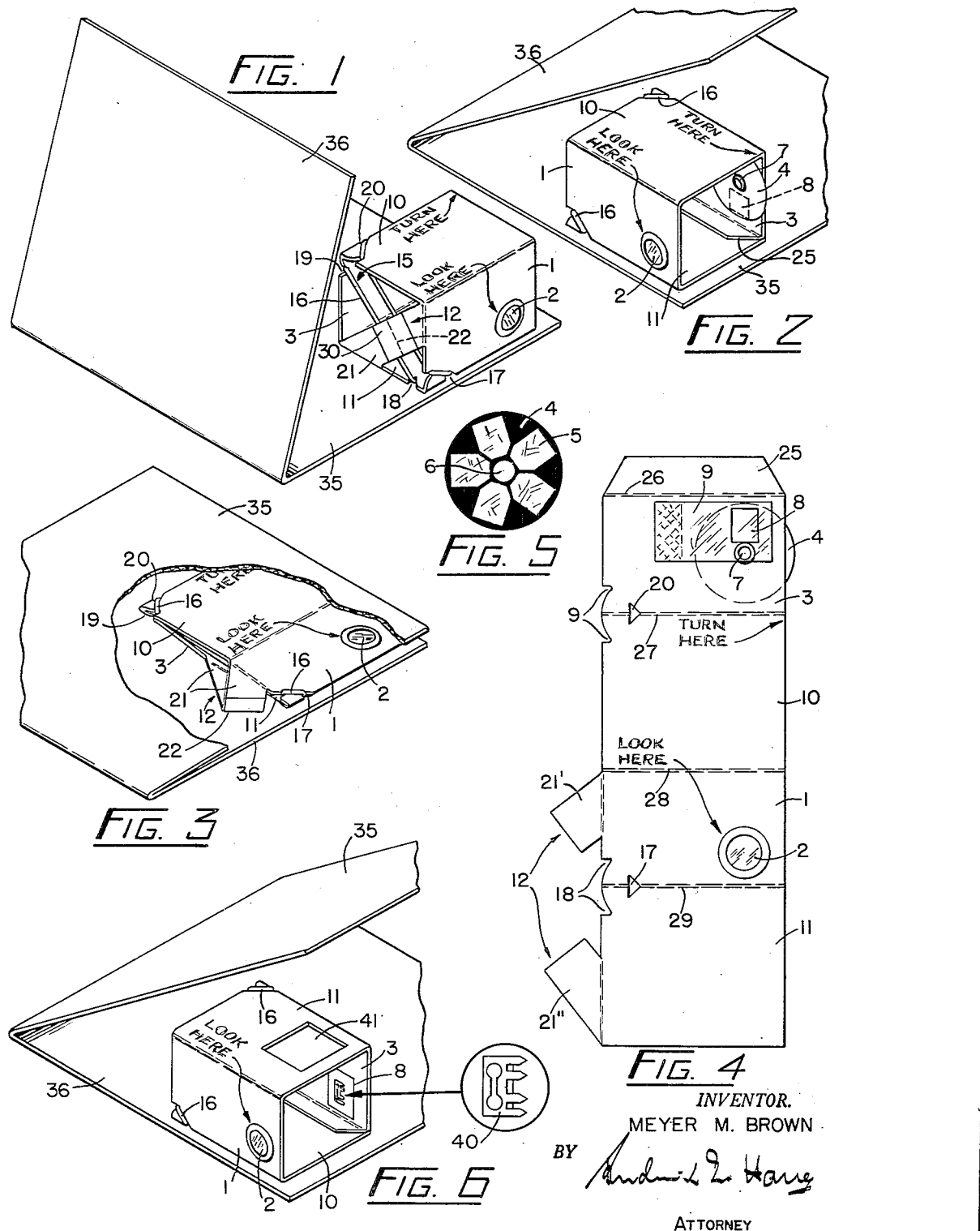

2,809,452

MAGNIFYING VIEWING DEVICE

Meyer M. Brown, New York, N. Y.

Application February 11, 1953, Serial No. 336,252

6 Claims. (Cl. 40—70)

The present invention relates to a viewing device for viewing an object, more particularly to a magnifying viewer for viewing a film having thereon one or more pictures and to a magnifying viewer for viewing a selected article.

Viewers of the general type above referred to, comprise a magnifying lens focused upon the object to be viewed, and a support structure supporting the lens and the film or providing means for mounting an object at the proper focal distance from the lens means. The support structure of viewers as hitherto known, is in form of a rigid frame or casing so that the viewer constitutes a three-dimensional usually box-like body. Such viewers are obviously too bulky to be placed in a flat envelope for instance for purpose of mailing either alone or as part of other items usually mailed in flat envelopes. Also, viewers with a box-like rigid frame occupy considerable space when stored or shipped in quantity.

One of the objects of the present invention is to provide a novel and improved viewer of the general type above referred to, which in contrast to conventional viewers is foldable in a substantially two-dimensional position. As a result, the viewer when in its folded position can be conveniently placed in an ordinary flat envelope. This has the advantage that the viewer, by a suitable selection of the object to be viewed, may be used for purpose of advertising, entertainment, etc. It can also be conveniently combined with pamphlets and other promotional literature, greeting cards, etc. and mailed together therewith in the manner of an ordinary letter thereby greatly increasing the attractiveness and the effectiveness of such items.

Another object of the invention is to provide a novel and improved viewer with a foldable frame or support structure which by the application of pressure can be collapsed in a substantially two-dimensional structure and upon release of the pressure automatically and immediately assumes a position in which the components of the viewer are disposed ready for viewing. Such viewer which may be referred to as a self-erecting or pop-up viewer may be placed in folded condition in an envelope or mounted between two pages of a greeting card, a promotional pamphlet or similar article and will automatically pop up when the two pages are unfolded. By relating the objects to be viewed to the information, pictures or other intelligence printed on the pages between which the viewer is disposed, the advertising or entertainment value of the article is greatly augmented.

Still another object of the invention is to provide a novel article of manufacture such as a greeting card, pamphlet or similar article which has the outward appearance of a conventional flat article of this type and may be placed in a conventional envelope for instance for mailing and which upon withdrawal from the envelope reveals a box-like structure in form of a viewer in a position ready for viewing.

Other and further objects, features and advantages of the invention will be pointed out hereinafter and set forth in the appended claims forming part of the application.

In the accompanying drawing several embodiments of the invention are shown by way of illustration and not by way of limitation.

In the drawing:

Fig. 1 is a perspective view of a viewing device placed between the two pages of a folder and shown in its pop-up or viewing position.

Fig. 2 shows the viewer of Fig. 1 from a different angle.

Fig. 3 is a perspective view showing the viewer of Fig. 1 in its flattened position.

Fig. 4 is a development of a blank from which the viewer of Figs. 1 to 3 is formed.

Fig. 5 is a plan view of a film disk as used in connection with the viewer according to Figs. 1 to 4, and Fig. 6 is a perspective view similar to Fig. 2 showing a modification of the viewer according to the invention in its erected or pop-up position.

A viewer according to the invention comprises basically a mounting for a magnifying lens, an object carrier, foldable support means for moving the lens mounting and the object carrier either into a viewing position relative to each other or into a flattened position, and yieldable means biasing the lens mounting and the object carrier from the flattened position into the viewing or erected position.

Referring now to Figs. 1 to 5 inclusive in detail, the viewer according to these figures is shown as comprising a wall member 1 in which is mounted by any suitable means a magnifying lens 2, and a wall member 3 supporting the object to be viewed and hence constituting the object carrier. In the viewer of Figs. 1 to 5 the object is shown as a circular film disk 4 which has thereon in radial arrangement a plurality of pictures 5. The film disk 4 has a center hole 6 and is rotatably mounted on wall member 3 by any suitable means such as an eyelet or rivet 7. The disk is preferably so disposed that a small marginal portion of the disk protrudes from the corresponding edge of wall member 3 to facilitate a rotation of the disk as can be clearly seen on Figs. 2 and 4. The film disk may either be permanently or exchangeably attached to wall 3. This wall is formed with an observation window 8 which permits to view successive pictures on the disk through lens 2, the focal distance of the said lens being such that the lens is focused upon the film disk when the viewer is in the position of Figs. 1 or 2. A strip 9 of translucent material is preferably attached to the outside of wall 3 to diffuse the incident light thereby improving the appearance of the picture viewable through lens 2.

While a rotary disk is generally the preferred arrangement it is also conceivable to employ an elongated strip guided on wall 3 and displaceable across the window 8 of wall 3.

The two wall members 1 and 3 are hingedly joined by two wall members 10 and 11 so that a box-like structure of substantially rectangular shape is formed when the viewer is in the viewing position. It will be evident from the previous analysis of the broad concept of the invention that a frame structure in form of a skeleton frame-work could also be employed instead of the illustrated solid wall members.

The hinge connection between the four wall members permits to collapse the same from the box-like or erect position into the flattened position of Fig. 3 in which wall members 1 and 10 are closely superimposed upon wall members 3 and 11 so as to form a substantially two-dimensional flat structure.

For the purpose of biasing the viewer from the flattened position of Fig. 3 into the erect position of Fig. 1 or 2 yieldable means generally designated by 15 are provided. These yieldable means are so disposed that they exert a pull upon the wall members biasing the same from the position of Fig. 3 toward the position of Fig. 1 or 2. According to the now preferred embodiment of the invention the yieldable means are attached to one corner of wall member 1 and extend diagonally to the remote corner of wall member 3. They may take various shapes for instance a tensioned coil spring may be employed. According to the now preferred embodiment of the invention a tensioned rubber elastic 16 is used which extends from the lower edge of wall member 1 to the upper edge of wall member 3. For purpose of conveniently attaching the elastic to the wall members, walls 1 and 11 are provided with retaining notches 17 and 18 respectively. Similar retaining notches 19 and 20 are provided in walls 3 and 10. The rubber elastic is looped over these notches as can best be seen on Fig. 1.

As will be apparent, instead of a diagonally arranged tensioned element correspondingly biased springs could also be fitted in any one of the corners formed by two adjacent walls.

Elastic 16 when tensioned sufficiently to effect rapid movement of the wall members from the flattened position into the erect position will tend to pull the wall members beyond the desired erect position. To prevent such over-pull limit means generally designated by 20 are provided. These limit means are shown as a strip 21 of non-stretchable material and including a folding line 22. This strip also extends diagonally between two wall members but in opposition to elastic 16. The length of this strip is such that it prevents a pull of the wall members beyond the proper erect position. When the wall members are flattened into the position of Fig. 3 the strip 21 folds itself outwardly as can best be seen on Fig. 3. Of course, it will be apparent that the limit strip 21 may also be positioned within the box-like structure in which case it will not be visible from the outside when folded.

Fig. 4 shows a blank for the viewer as hereinbefore described. This blank shows that the four wall members can be joined by a tongue 25 extending from wall member 3 and permanently fastened for instance by gluing to wall member 11. The hinge connection between the four wall members is obtained by providing in the blank score lines 26, 27, 28 and 29. The blank also shows that strip 21 is formed by two tongues 21' and 21'' which are joined by a flexible label 30. The blank is preferably made of card board or paper of sufficient stiffness.

The viewer as hereinbefore described may be placed in a flattened position in a flat envelope and will pop up into its erect position when withdrawn from the envelope. However, I have found that the effect of the viewer may be increased by placing the viewer between the two pages 35 and 36 of a folder. The viewer is shown as being fastened for instance by gluing to the inside of page 36. As a result, the viewer will be automatically flattened when the two pages are in the superimposed position of Fig. 3 and will automatically pop up into its erect position when the folder is unfolded as shown in Figs. 1 and 2.

The folder may be visualized as a greeting card or as an item of promotional literature. In either case the pictures to be viewed bear preferably some relation to the intelligence conveyed by the folder. For instance in case the folder represents promotional literature the film disk may show views of some of the articles described in the folder. When the folder is a greeting card, amusing or otherwise appropriate pictures can be shown; also for instance photographs of the person sending the greeting card.

It will now be apparent that the folder with the viewer in flattened position can be mailed in the same manner as an ordinary letter and has the outward appearance of such letter.

The modification of Fig. 6 shows an arrangement similar to the arrangement hereinbefore described except that according to Fig. 6 the rotary disk is replaced by an actual complete item of merchandise or a small portion of such item as is indicated by the showing of a structure 40. It is further possible to show magnified views of items such as seeds, samples of paper, cloth, etc. A piece of fabric or threads may also be placed across the window 8 in which case the viewer may be used as a linen counter. To increase the intensity of the incident light reaching the item to be viewed a window 41 is preferably provided in wall 11. Such window is generally useful as the article to be viewed may frequently be opaque or afford only little translucency.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A magnifying viewing device for viewing an object comprising, in combination, a support frame including two wall members and linking means hingedly joining the two wall members for movement thereof between a plane-parallel spaced apart position and a substantially coplanar position, a folder having a pair of hingedly connected leaves defining a pair of inside faces, said support frame being secured to one of said inside faces, the other of said inside faces being selectively movable into abutment with said support frame, magnifying lens means mounted in one of said wall members, the other wall member forming an object carrier, the said lens means being focused upon an object supported on said object carrier when the said wall members are in said plane-parallel position, the said latter position constituting the viewing position of the device, yieldable means coacting with said support frame and including an elastically stretchable ribbon-like member extending in tensioned condition from one edge of one of said wall members to the diagonally opposite edge of the other wall member so as to bias said wall members from said coplanar position toward and beyond said viewing position, and limit means for retaining the wall members in said viewing position against the action of the stretchable member, said limit means including a bendable non-stretchable elongated member diagonally extending from another edge of one wall member to the adjacent edge of said linking means whereby the stretchable member and the non-stretchable member cross each other, the length of said non-stretchable bendable element, when extended, being such as to retain the wall members in said viewing position, movement of said other of said leaves toward said one of said leaves and said support frame being operative to effect movement of said members to said co-planar position, movement of the other of said leaves in an opposite direction being operative to disengage said frame to permit movement of said members to said viewing position by said yieldable means.

2. A viewing device according to claim 1, wherein the said stretchable member is in form of a rubber elastic, each of said wall members being formed at the respective edge with receiving notches in which is looped said rubber elastic.

3. A magnifying viewing device for viewing an object comprising, in combination, a folder having a pair of hingedly connected leaves defining a pair of inside faces, a collapsible member having four wall members hingedly connected, one of said wall members being secured to one of said inside faces of said folder, the other of said pair of inside faces being arranged to overlie said collapsible member, said collapsible member being movable between an erect spacial three-dimensional relationship in which the four wall members form a box-like structure having a substantially rectangular cross-section and a collapsed relationship in which two adjacent wall members are superimposed upon the other two adjacent wall members so as to form a flat substantially two-dimensional structure, a magnifying lens mounted in one of said wall members, the opposite wall member forming an object carrier, the spacing of said latter two wall members corresponding to the focal distance of the lens means when said four wall members form said box-like structure, the said box-like relative position of the wall members being the viewing position of the device, resilient means coacting with said wall members and biasing the same from said collapsed position toward said viewing position of the device, limit means on said box-like structure acting between predetermined wall members for preventing continued movement of the wall members beyond the erect position thereof, said leaves of said folder being selectively movable between an open and closed relationship, said leaves when in said closed position being operative to maintain said collapsible member in said collapsed relationship against the action of said resilient means, said leaves when moved from said closed relationship to said open relationship being operative automatically to release said collapsible member for movement to said erect position under the action of said yieldable means independently of the relative movement of said leaves, said movement of said collapsible member being limited by said limit means automatically to maintain the distance between said lens and said object carrier substantially within the focal distance of said lens.

4. A viewing device according to claim 3, wherein the said wall member mounting the lens means and the opposite wall member are formed with retaining notches, and wherein the said stretchable member is in form of an endless rubber elastic looped over said notches.

5. A viewing device according to claim 3, wherein one of the wall members adjacent to the wall member mounting said lens means is formed with a window for admitting incident light to the wall member forming the object carrier.

6. A viewing device according to claim 3, wherein the said wall member forming the object carrier is formed with a window in optical alignment with the optical axis of the lens means for placing the object to be viewed in said window.

References Cited in the file of this patent

UNITED STATES PATENTS

| | | |
|---|---|---|
| 555,876 | Norrington | Mar. 3, 1896 |
| 822,841 | Hill | June 5, 1906 |
| 990,918 | Stadler | May 2, 1911 |
| 1,554,905 | Bignold | Sept. 22, 1925 |
| 1,903,104 | Fortuna | Mar. 28, 1933 |
| 2,601,619 | Loomis | June 24, 1952 |
| 2,692,530 | Gowland | Oct. 26, 1954 |

FOREIGN PATENTS

| | | |
|---|---|---|
| 26,689 | Great Britain | Dec. 7, 1904 |
| 173,849 | Great Britain | Jan. 5, 1922 |
| 467,854 | Great Britain | June 24, 1937 |